United States Patent
Xue et al.

(10) Patent No.: US 11,809,882 B2
(45) Date of Patent: Nov. 7, 2023

(54) INTERFACE CALLING METHOD AND APPARATUS, AND COMPUTER-READABLE STORAGE MEDIUM

(71) Applicant: Tencent Technology (Shenzhen) Company Limited, Shenzhen (CN)

(72) Inventors: Yuansheng Xue, Shenzhen (CN); Yuan Hai, Shenzhen (CN); Yanghao Ou, Shenzhen (CN); Zhiwei Guo, Shenzhen (CN); Chao Lin, Shenzhen (CN); Canhui Huang, Shenzhen (CN); Sicheng Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/725,424

(22) Filed: Apr. 20, 2022

(65) Prior Publication Data

US 2022/0244967 A1 Aug. 4, 2022

Related U.S. Application Data

(63) Continuation of application No. PCT/CN2021/091868, filed on May 6, 2021.

(30) Foreign Application Priority Data

May 26, 2020 (CN) .......................... 202010454247.6

(51) Int. Cl.
*G06F 3/00* (2006.01)
*G06F 9/448* (2018.01)
(Continued)

(52) U.S. Cl.
CPC .............. *G06F 9/448* (2018.02); *G06F 9/455* (2013.01); *G06F 9/54* (2013.01)

(58) Field of Classification Search
CPC ....................................................... G06F 9/54
(Continued)

(56) References Cited

U.S. PATENT DOCUMENTS 5,574,854 A * 11/1996 Blake .................. G06F 11/3688
714/28
8,881,278 B2 * 11/2014 Kaplan ................ G06F 40/154
726/23

(Continued)

FOREIGN PATENT DOCUMENTS

CN 103440457 A * 12/2013
CN 107025133 A * 8/2017 ........... G06F 3/0619
(Continued)

OTHER PUBLICATIONS

David Saff, Mock Object Creation for Test Factoring. (Year: 2004).*
(Continued)

*Primary Examiner* — Lechi Truong
(74) *Attorney, Agent, or Firm* — Morgan, Lewis & Bockius LLP

(57) ABSTRACT

An electronic device receives an interface calling request for a target interface in an application program. The interface calling request includes interface calling information of the target interface. The device performs an interface query in a simulated interface set that simulates real interfaces in the application program. In accordance with a determination, based on the interface query, that a target simulation interface corresponding to the target interface exists in the simulated interface set, the device intercepts the interface calling request. The device compares the intercepted interface calling information with interface configuration information of the target simulated interface. In accordance with a determination that the interface calling information matches the interface configuration information, the device obtains simulated response data corresponding to the target (Continued)

simulation interface. The device outputs calling response data of the interface calling request.

18 Claims, 8 Drawing Sheets

(51) Int. Cl.
  *G06F 9/455* (2018.01)
  *G06F 9/54* (2006.01)
(58) Field of Classification Search
  USPC .......................................................... 719/328
  See application file for complete search history.

(56) References Cited

U.S. PATENT DOCUMENTS

| | | | | |
|---|---|---|---|---|
| 9,846,774 | B2* | 12/2017 | Alme | ................... G06F 9/45504 |
| 10,768,966 | B1* | 9/2020 | Naenko | ............... G06F 9/45545 |
| 2007/0213969 | A1* | 9/2007 | Sanders | ................ G06F 9/4486 |
| | | | | 703/22 |
| 2012/0124425 | A1* | 5/2012 | Blouin | ................... G06F 11/261 |
| | | | | 714/E11.177 |
| 2015/0074647 | A1* | 3/2015 | Levi | .................... G06F 11/3672 |
| | | | | 717/124 |
| 2015/0331979 | A1* | 11/2015 | Englehart | ............... G06F 30/20 |
| | | | | 703/2 |
| 2018/0121226 | A1* | 5/2018 | Liu | ..................... G06F 11/3006 |
| 2018/0365140 | A1 | 12/2018 | Bates | |
| 2020/0409716 | A1* | 12/2020 | Balasubramanian | ... G06F 9/541 |
| 2021/0286715 | A1* | 9/2021 | Ono | ..................... G06F 11/3684 |

FOREIGN PATENT DOCUMENTS

| | | | |
|---|---|---|---|
| CN | 107368405 A | 11/2017 | |
| CN | 109739656 A | 5/2019 | |
| CN | 110727524 A | 1/2020 | |
| CN | 110851364 A | 2/2020 | |
| CN | 111953775 A | 11/2020 | |
| CN | 112685291 A | 4/2021 | |
| CN | 113722020 A * | 11/2021 | ............. G06F 9/448 |

OTHER PUBLICATIONS

Michael Roland, Managing the life-cycle of Java Card applets in other Java virtual machines. (Year: 2014).*

Tencent Technology, WO, PCT/CN2021/091868, Jul. 27, 2021, 5 pgs.

Tencent Technology, IPRP, PCT/CN2021/091868, Nov. 17, 2022, 6 pgs.

Tencent Technology, ISR, PCT/CN2021/091868, Jul. 27, 2021, 3 pgs.

* cited by examiner

| Data generation | ○ Customization  ● Data template |

Mock template:

```
1  {
2    "data": {
3      "list|10": {
4        {"id|+1": 1, "name": "@FIRST"}
5      }
6    },
7    "statusCode": 200,
8    "header": {
9      "content-type": "application/json; charset=utf-8"
10   }
11 }
```

Data template syntax document

```
1  // Preview of data generated by the template (only
     for preview without any other objective)
2  {
3    "data": {
4      "list": [
5        {
6          "id": 1,
7          "name": "Timothy"}
8        },
9        {
10         "id": 2,
11         "name": "Christopher"
```

FIG. 2C

INTERFACE CALLING METHOD AND APPARATUS, AND COMPUTER-READABLE STORAGE MEDIUM

CROSS-REFERENCE TO RELATED APPLICATIONS

This application is a continuation application of PCT Patent Application No PCT/CN2021/091868, entitled "INTERFACE CALLING METHOD AND APPARATUS, AND COMPUTER-READABLE STORAGE MEDIUM" filed on May 6, 2021, which claims priority to Chinese Patent Application No. 202010454247.6, filed with the State Intellectual Property Office of the People's Republic of China on May 26, 2020, and entitled "INTERFACE CALLING METHOD AND APPARATUS, AND COMPUTER-READABLE STORAGE MEDIUM", all of which are incorporated herein by reference in their entirety.

FIELD OF THE TECHNOLOGY

This application relates to the field of computers, and specifically, to an interface calling method and apparatus, and a computer-readable storage medium.

BACKGROUND OF THE DISCLOSURE

In a development process of software, frontend and backend integration test is required. The frontend and backend integration test is a method that performs switching back and forth between real business data and simulated data (e.g., native mock data) to achieve data exchange at different development speeds under a frontend and backend separation structure. In an actual project development process, such as when the frontend and the backend are developed at the same time, if interface data of the backend is not obtained, development of the frontend may be affected. For a developer of the frontend, the frontend and backend integration test may be performed provided that data is obtained, so that the frontend can simulate data to simulate development. As a result, the efficient development method of application programming interface (API) Mock development has created a lot of convenience for developers in terms of facilitating such integration tests.

SUMMARY

An embodiment of this application provides an interface calling method, including:

receiving an interface calling request (e.g., interface invocation request) for a target interface in an application program, the interface calling request including interface calling information (e.g., interface invocation information) of the target interface;

based on the target interface, performing an interface query in a simulated (e.g., mock) interface set, wherein the simulated interface set includes one or more simulated interfaces that simulate real interface in the application program;

when it is queried that (e.g., in accordance with a determination, by executing a query) a target simulation interface corresponding to the target interface exists in the simulated interface set, intercepting the interface calling request, and comparing the interface calling information in the intercepted interface calling request with interface configuration information of the target simulated interface;

in accordance with a determination that the interface calling information matches the interface configuration information, obtaining simulated response data (e.g., mock response data) corresponding to the target simulation interface; and based on the simulated response data, outputting calling response data (e.g., invocation response data) of the interface calling request.

Correspondingly, an embodiment of this application further provides an interface calling apparatus, including:

a receiving unit, configured to receive an interface calling request for a target interface in an application program, the interface calling request including interface calling information of the target interface;

a querying unit, configured to perform interface querying in a simulated interface set based on the target interface, the simulated interface set including simulated interfaces simulating real interfaces in the application program;

a matching unit, configured to intercept the interface calling request in accordance with a determination (e.g., via querying) that the simulated interface set includes a target simulated interface corresponding to the target interface, and match the interface calling information in the intercepted interface calling request with interface configuration information of the target mock interface;

an obtaining unit, configured to obtain simulated response data corresponding to the target simulated interface when the interface calling information is successfully matched with the interface configuration information; and an output unit, configured to output calling response data of the interface calling request based on the simulated response data corresponding to the target simulated interface.

In some embodiments, the querying unit may include an obtaining subunit, a traversing subunit, and a determining subunit;

the obtaining subunit may be specifically configured to obtain a simulated interface set, the mock interface set including mock interfaces of at least one application program;

the traversing subunit may be specifically configured to traverse the simulated interfaces in the simulated interface set according to the target interface; and the determining subunit may be specifically configured to: when it is queried that the simulated interface set includes a simulated interface that is the same as (e.g., identical to) the target interface, determine the simulated interface as a target simulated interface corresponding to the target interface.

In some embodiments, the determining subunit may be specifically configured to: in accordance with a determination that the simulated interface set does not include a simulated interface that is the same as the target interface, call a real interface corresponding to the target interface in the application program to obtain calling response data; and output the calling response data of the interface calling request.

In some embodiments, the receiving unit may be specifically configured to: in accordance with a detection (e.g., determination) that a logic layer in the application program calls the target interface, generate the interface calling request of the application program; and receive the interface calling request by using a communication layer in the application program.

In some embodiments, the matching unit may include an interception subunit and a matching subunit; the interception subunit may be specifically configured to: trigger the communication layer to perform an intercept operation in a case of querying that the simulated interface set includes the target simulated interface corresponding to the target interface; and intercept the interface calling request in the communication layer based on the intercept operation.

In some embodiments, the matching subunit may be specifically configured to: transmit the intercepted interface calling information to an interface simulation module (e.g., interface mocking module) in the application program; and trigger the interface simulation module to match the interface calling information with the interface configuration information of the target simulated interface.

In some embodiments, the interface calling apparatus may further include a configuration unit, and the configuration unit may include a display subunit, an adding subunit, and a configuration subunit;

the display subunit may be specifically configured to display an interface simulation page of the interface simulation module;

the adding subunit may be specifically configured to add a to-be-simulated interface in the application program to the interface simulation page, to obtain a simulated interface of the application program; and the configuration subunit may be specifically configured to perform parameter configuration and calling response setting on the simulated interface of the application program, to obtain interface configuration information of the simulated interface and simulated response data corresponding to the simulated interface.

In some embodiments, the configuration subunit may be specifically configured to perform request identifier, request path, and request parameter configuration on the simulated interface of the application program, to obtain the interface configuration information of the simulated interface; and set a callback type, a data generation manner, and simulated data of the mock interface, to obtain the simulated response data corresponding to the simulated interface.

In addition, an embodiment of this application further provides a non-transitory computer-readable storage medium, storing a plurality of instructions, the instructions being suitable for being loaded by a processor, to perform the operations of any interface calling method according to the embodiments of this application.

Herein, an embodiment of this application further provides an electronic device, including a memory, a processor, and a computer program stored on the memory and executable on the processor, the processor, when executing the program, implementing the operations of any interface calling method according to the embodiments of this application.

BRIEF DESCRIPTION OF THE DRAWINGS

To describe the technical solutions in embodiments of this application, the following briefly describes accompanying drawings required for describing the embodiments. Apparently, the accompanying drawings in the following description show merely some embodiments of this application, and a person skilled in the art may still derive other accompanying drawings from these accompanying drawings without creative efforts.

FIG. 2C is a schematic diagram of data template setting according to an embodiment of this application.

DESCRIPTION OF EMBODIMENTS

The following clearly and completely describes the technical solutions in embodiments of this application with reference to the accompanying drawings in the embodiments of this application. Apparently, the described embodiments are some embodiments of this application rather than all of the embodiments. All other embodiments obtained by a person skilled in the art based on the embodiments of this application without creative efforts shall fall within the protection scope of this application.

Extra tool libraries are introduced in code mainly in some API simulation solutions, which has a certain threshold and increases development and maintenance costs, thereby affecting the development efficiency.

The embodiments of this application provide an interface calling method and apparatus, and a computer-readable storage medium. The interface calling apparatus may be integrated in an electronic device, and the electronic device may be a device such as a server or a terminal.

Figure 1A:
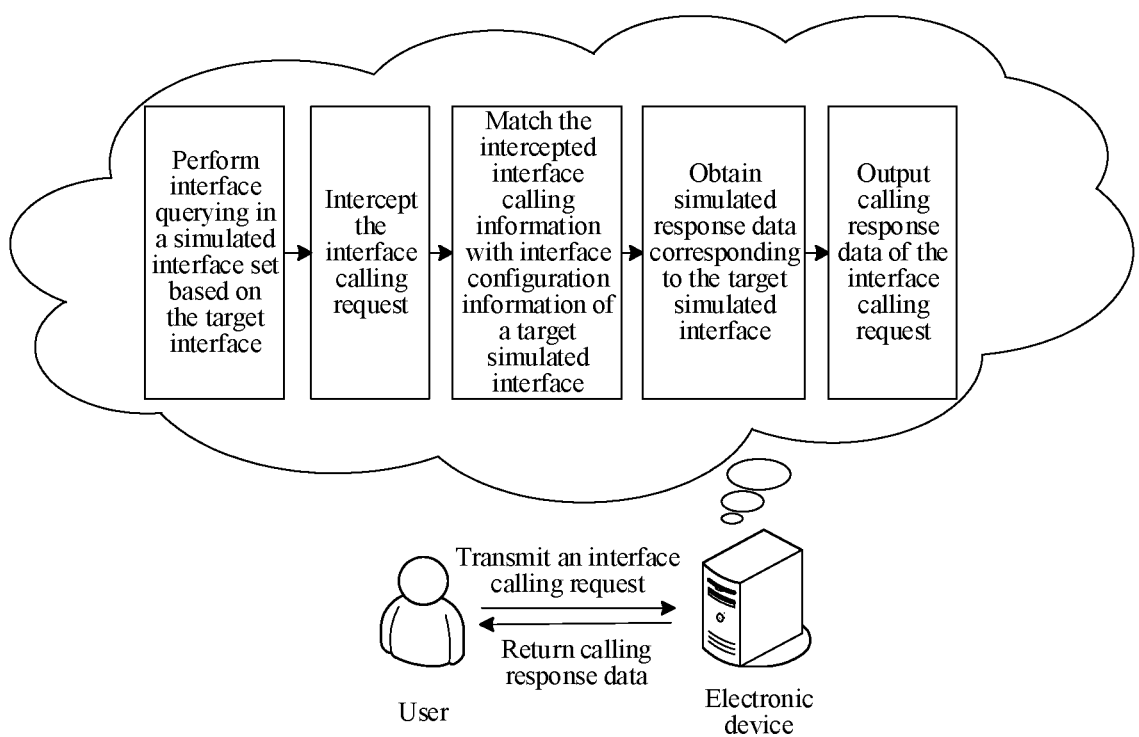
FIG. 1A is a schematic diagram of a scenario of an interface calling (e.g., interface invocation) method according to an embodiment of this application.

For example, referring to FIG. 1A, the terminal integrating the interface calling apparatus may receive an interface calling (e.g., interface invocation) request for a target interface in an application program, where the interface calling request includes interface calling information of the target interface. The terminal then performs interface querying in a simulated (e.g., mock, imitated, etc.) interface set based on the target interface, where the simulated interface set includes simulated interfaces simulating real interfaces in the application program. When it is queried that the simulated interface set includes a target simulated interface, the terminal intercepts the interface calling request, and compares the intercepted interface calling information with interface configuration information of the target mock interface. When a match exists between the interface calling information and the interface configuration information, the terminal obtains mock (e.g., simulated) response data corresponding to the target simulated interface, and outputs calling response data of the interface calling request based on the simulated response data corresponding to the target simulated interface.

In this solution, the target simulated interface corresponding to the target interface may be searched in the simulated interface set according to the received interface calling request for the target interface, and the calling response data may be generated according to the mock response data corresponding to the target simulated interface, so that a frontend can simulate data to implement interface calling when there is no interface data from a backend, to complete interface testing, thereby improving the interface testing efficiency, mocking/simulation development, and improving the development efficiency.

Detailed descriptions are separately provided below. The description sequence of the following embodiments is not intended to limit preference orders of the embodiments.

This embodiment is described in terms of the interface calling apparatus. The interface calling apparatus may be specifically integrated in an electronic device, and the electronic device may be a device such as a server or a terminal. The terminal may include devices that may implement interface calling such as a mobile phone, a tablet computer, a notebook computer, or a personal computer (PC).

An interface calling method is provided, including: receiving an interface calling request for a target interface in an application program, the interface calling request including interface calling information of the target interface; performing interface querying in a simulated interface set based on the target interface, the simulated interface set including simulated interfaces simulating real interfaces in the application program; intercepting the interface calling request in a case of querying that the simulated interface set includes a target simulated interface, and matching the intercepted interface calling information with interface configuration information of the target simulated interface; obtaining simulated response data corresponding to the target simulated interface when the interface calling information is successfully matched with the interface configuration information; and outputting calling response data of the interface calling request based on the simulated response data corresponding to the target simulated interface.

Figure 1B:
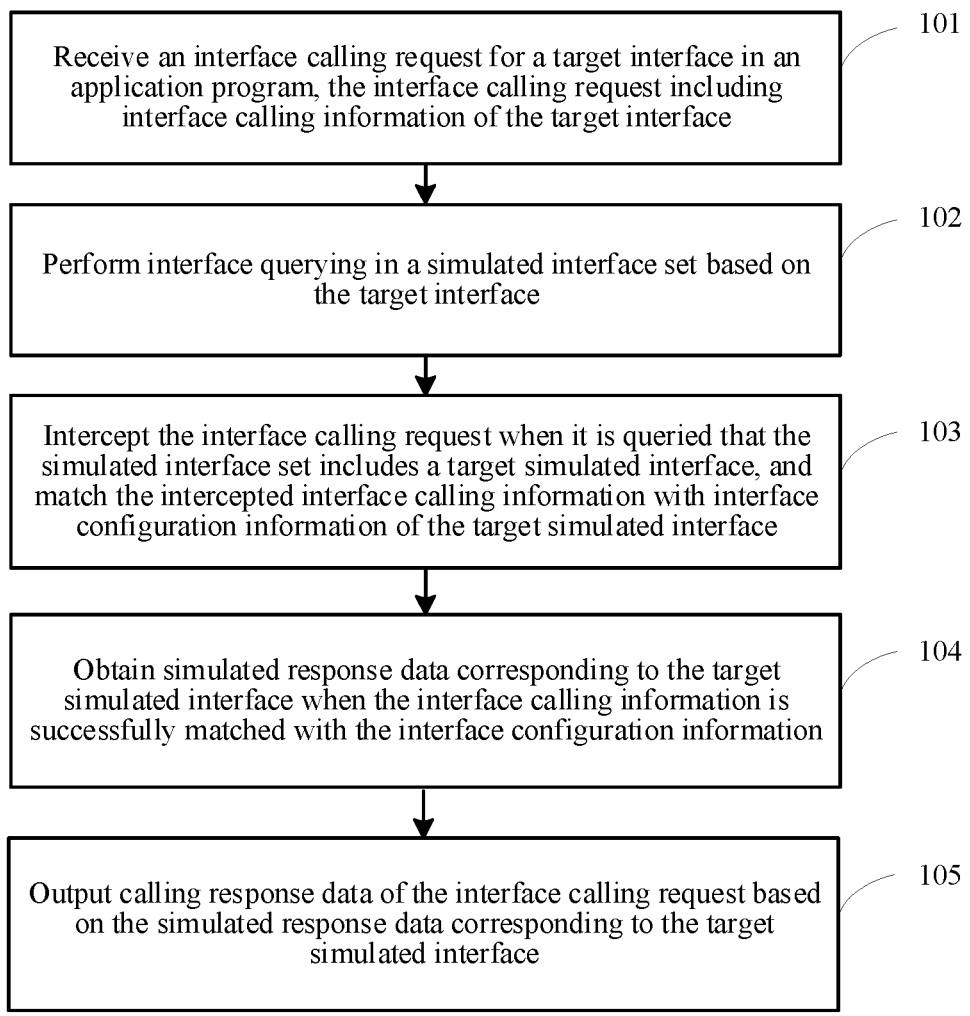
FIG. 1B is a flowchart of an interface calling method according to an embodiment of this application.

As shown in FIG. 1B, an exemplary procedure of the interface calling method may include the following steps:

101: Receive an interface calling request for a target interface in an application program, the interface calling request including interface calling information of the target interface.

For example, the interface calling apparatus may be specifically integrated in an electronic device, to perform mock tests for an interface calling request for a target interface in an application program, to obtain calling response data. To improve the development efficiency, mock data configuration may be performed on an interface that needs to be simulated, so that simulated response data returned by the interface may be simulated when interface calling is performed, thereby completing interface testing. For example, the interface calling apparatus can obtain a data packet of this request when a user transmits an interface calling request to a target interface in an application program by using a client, namely, obtain interface calling information of the target interface.

A simulated test refers to simulation, for some objects that is not easy to construct or obtain, behavior of an object by creating a simulated object thereof. For example, a specific response corresponding to a request may be assumed in advance, so that every time when a client transmits the request to a server end, the server end can transmit the response assumed in advance to the client, to enable the client to receive the response assumed in advance, thereby mimicking behavior of generating a real response according to a request.

For example, specifically, when it is detected that a logic layer in an application program calls a target interface, an interface calling request of the application program may be generated, and the interface calling request is received by a communication layer in the application program.

The application program is one of main branches of computer software and refers to software written for a specific application objective of a user. For example, in the embodiments of this application, the application program may be an applet. The applet is an application form between a native application and a web application. The applet does not need to be downloaded and installed in a control device, and may be directly opened and used in an instant messaging client without occupying an internal memory of the control device, which is more convenient and efficient during use. An instant messaging system provides a basic software development kit (SDK) for developers of applets and opens a backend server to the developers, so that the performance and smoothness of the applets are much higher than those of web applications. The instant messaging system includes a terminal and a backend server, the terminal is connected to the server through a network, and the instant messaging system further includes network devices such as a gateway and a router. The terminal integrates a client of an instant messaging application, the backend server integrates a server end of the instant messaging application, and the server end and the client may perform information exchange.

The SDK provided by the instant messaging system for the developers of applets includes components, framework application programming interfaces (APIs), and developer testing tools such as a WX developer tool (hereinafter referred to as a developer tool). The APIs are some functions that are pre-defined or protocols of connections among different components of a software system such as protocols of connections among the applets and an operating system of the control device.

102: Perform interface querying in a simulated interface set based on the target interface.

The simulated interface set includes simulated interfaces simulating (e.g., imitating, mimicking, etc.) real interfaces in the application program. For example, specifically, a simulated interface set may be obtained, the simulated interface set includes simulated interfaces of at least one application program, and the simulated interfaces in the simulated interface set are traversed according to the target interface. When it is queried that the simulated interface set includes a simulated interface that is the same as the target interface, the simulated interface is determined as a target simulated interface.

For example, a simulated interface list of the simulated interface set may be obtained, and traversing is performed from a start position of the simulated interface list to match with the target interface sequentially. For example, traversing may be performed from the start position of the simulated interface list, and when a current simulated interface in the simulated interface list is traversed, an interface name corresponding to the current simulated interface is matched with an interface name of the target interface; when the matching succeeds, the current simulated interface is determined as a target simulated interface corresponding to the target interface; and when the matching fails, a next simulated interface of the current simulated interface is updated as a current simulated interface, and the step when the current simulated interface in the simulated interface list is traversed is performed again until the simulated interface list is completely traversed.

In some embodiments, if the simulated interface that is the same as the target interface is still not matched after all simulated interfaces in the simulated interface list are traversed, namely, if the simulated interface set does not include the simulated interface that is the same as the target interface, a real interface may be called. That is, the request is forwarded to a third-party server, and a normal calling procedure of an interface continues to be performed, to ensure normal operation of tests, and the user may be further prompted, so that the user can add a simulated interface corresponding to the target interface in the mock interface set according to an actual situation. For example, specifically, when the simulated interface set does not include the simulated interface that is the same as the target interface, a real interface corresponding to the target interface in the application program is called to obtain calling response data, and the calling response data corresponding to the interface calling request is outputted. For example, interface calling may continue to be performed from the third-party server, to obtain real calling response data.

In another example, the simulated interface set may be adjusted by using an interface simulation module in the interface calling apparatus. For example, specifically, a simulated interface set adjustment request of the user may be received, and adjustment such as addition, deletion, or modification is performed on the simulated interface set according to the adjustment request.

103: Intercept the interface calling request when it is determined (e.g., based on querying) that the simulated interface set includes a target simulated interface corresponding to the target interface, and match the interface calling information in the intercepted interface calling request with interface configuration information of the target simulated interface.

For example, specifically, when it is determined that the simulated interface set includes a target simulated interface, a communication layer is triggered to perform an intercept operation, and the interface calling request is intercepted in the communication layer based on the intercept operation.

To cause code of a program to be non-invasive, an interface simulation module may be configured in the developer tools for testing, so that the frontend staff can be independent of the backend when performing frontend and backend integration test, thereby improving the development efficiency. For example, before the intercepted interface calling information is matched with the interface configuration information of the target simulated interface, parameter configuration may be first performed on the simulated interfaces in the mock interface set. Specifically, the process may include: displaying an interface simulation page of the interface simulation module; adding a to-be-simulated interface in the application program to the interface simulation page, to obtain a simulated interface of the application program; and performing parameter configuration and calling response setting on the simulated interface of the application program, to obtain interface configuration information of the simulated interface and simulated response data corresponding to the simulated interface.

In some embodiments, the performing parameter configuration and calling response setting on the simulated interface of the application program, to obtain interface configuration information of the simulated interface and simulated response data corresponding to the mock interface specifically may include: performing request identifier, request path, and request parameter configuration on the simulated interface of the application program, to obtain the interface configuration information of the simulated interface; setting a callback type, a data generation manner, and simulated data of the simulated interface, to obtain the simulated response data corresponding to the mock interface.

The request identifier may be a request name or a request serial number. For example, the request identifier may be a uniform resource locator (URL) The request path may be an access path and a resource name. The resource name refers to a direct name such as show.jsp of resource to be accessed or an indirect path such as show.do having a mapping relationship with the resource to be accessed. The access path refers to specific resources that can be positioned by using the path, namely, other parts other than the resource name in URL resource access paths. For example, in http://127.0.0.1:8080/demo/hello.do, http://127.0.0.1:8080/demo/ is a resource path, and hello.do is a resource name. The request path may be divided into two types: an absolute path and a relative path according to a standard that whether one resource can be uniquely positioned. The absolute path refers to that one resource can be uniquely positioned. In a Web application, in general cases, a path starting from a request protocol is an absolute path. The absolute path is represented in the form of an URL. The relative path refers to that one resource cannot be uniquely positioned only according to the path. However, after the relative path is combined with a reference path, the relative path can be converted into an absolute path that can position resource, and such a path is referred to as a relative path. In a Web application, in general cases, a path not starting from a request protocol is a relative path. The relative path is represented in the form of a uniform resource identifier (URI). A conversion relationship among the paths may be represented as: absolute path=reference path+relative path.

The callback type may be a simulated success type or a simulated failure type. The data generation method may be customization or a method using a data template. The simulated data can be set according to the data generation method selected by the user.

For example, in some embodiments, the matching the intercepted interface calling information with interface configuration information of the target simulated interface specifically may include: transmitting the intercepted interface calling information to an interface simulation module in the application program; and triggering the interface simulation module to match the interface calling information with the interface configuration information of the target simulated interface.

The preset interface simulation module may be flexibly set according to requirements of an actual application.

104: Obtain simulated response data corresponding to the target simulated interface in a case that the interface calling information is successfully matched with the interface configuration information.

One simulated interface may be provided with one or more pieces of interface configuration information. For example, when one simulated interface is provided with one piece of interface configuration information, and the interface calling information matches the interface configuration information, the matching succeeds; and when one simulated interface is provided with a plurality of pieces of interface configuration information, and the interface calling information matches the plurality of pieces of interface configuration information simultaneously, the matching succeeds.

For example, when the interface calling information is successfully matched with the interface configuration information, the simulated response data corresponding to the target simulated interface may be determined according to the callback type, the data generation method, and the simulated data that are set.

105: Output calling response data of the interface calling request based on the simulated response data corresponding to the target mock interface.

For example, specifically, after the simulated response data corresponding to the target simulated interface is determined, the calling response data of the interface calling request may be generated and returned to the client. That is, the calling response data of the interface calling request is returned to complete interface testing.

To facilitate multi-person cooperation, when it is required to share the interface configuration information of the simulated interface with other members in a development project, the interface configuration information may be exported in the interface simulation module, and a configuration file is then transmitted to other members for importing.

As can be known from the above, this embodiment may include: receiving an interface calling request for a target interface in an application program, the interface calling request including interface calling information of the target interface; performing interface querying in a simulated interface set based on the target interface, the simulated interface set including simulated interfaces simulating real interfaces in the application program; intercepting the interface calling request in accordance with a determination that the simulated interface set includes a target simulated interface, and matching the intercepted interface calling information with interface configuration information of the target simulated interface; obtaining simulated response data corresponding to the target simulated interface in accordance with a determination the interface calling information is successfully matched with the interface configuration information (e.g., after performing a comparison); and outputting calling response data of the interface calling request based on the simulated response data corresponding to the target simulated interface. The frontend and the backend develop at the same time, when the frontend does not have support of interface data of the backend, according to this solution, the target simulated interface corresponding to the target interface may be searched in the simulated interface set according to the interface calling request for the target interface, and the calling response data may be generated according to the simulated response data set by the target simulated interface in the interface simulation module, so that the frontend can simulate data to complete interface testing, thereby improving the interface testing efficiency, mocking development, and improving the development efficiency. In this solution, the interface simulation module is created, code does not need to be embedded into code, no extra packet or framework is introduced, which is totally independent development, so that code can be reused, has few dependence, which is convenient for porting, supports importing and exporting, and is convenient for multi-person cooperation.

According to the method described in the previous embodiment, the following further provides detailed description by using an example.

In this embodiment, a description is made by using an example in which the interface calling apparatus is specifically integrated in an electronic device and the application program is specifically an applet. An applet is an application program that can be used without being downloaded and installed. For example, a WeChat applet is an application form between a native application and a web application. The applet does not need to be downloaded and installed in a control device, and may be directly opened and used in an instant messaging client without occupying an internal memory of the control device, which is more convenient and efficient during use. For example, the user can open applets such as "Mobike", "ELE", and "Tencent Video" through scanning or searching in an instant messaging client (for example, WeChat). In addition, an instant messaging system provides a basic software development kit (SDK) for developers of applets and opens a backend server to the developers, so that the performance and smoothness of the applets are much higher than those of web applications.

An underlying model of the applet is different from that of a web client, so that the developer needs to perform a simulation function to migrate an existing simulated solution of the web client to the applet. However, use of WxMock has relatively high invasion for code and the solution is not very ideal during use. Besides, the applet needs to mock a plurality of APIs, but the simulation solution of the web client is only for Ajax requests.

Mock.js is implemented based on the web client, the developer tool is different from implementation on a browser, so that Mock cannot be recognized. Although WxMock supports use in applets, such a solution has certain invasion for code of the applets, and only APIs related to requests are implemented while scenarios of other APIs cannot be covered. An API Mock capability of the developer tool can resolve the problem of mocking data returned by APIs of the applets. A specific implementation is described in detail below.

(I) First, an interface simulation module may be created in a developer tool of an electronic device, and the following steps may be specifically included:

(1) Display an interface simulation page of the interface mocking module.

Figure 2A:
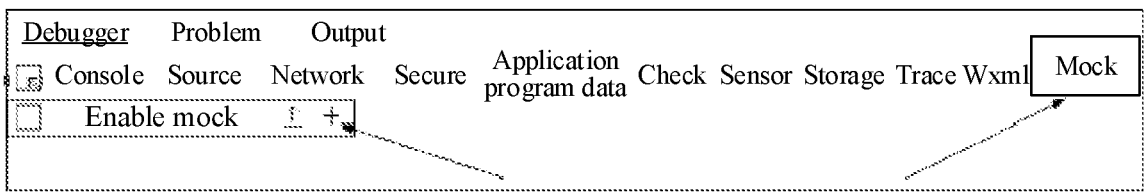
FIG. 2A is a schematic diagram of creating an interface mocking module (e.g., an interface simulation module) according to an embodiment of this application.
Figure 2B:
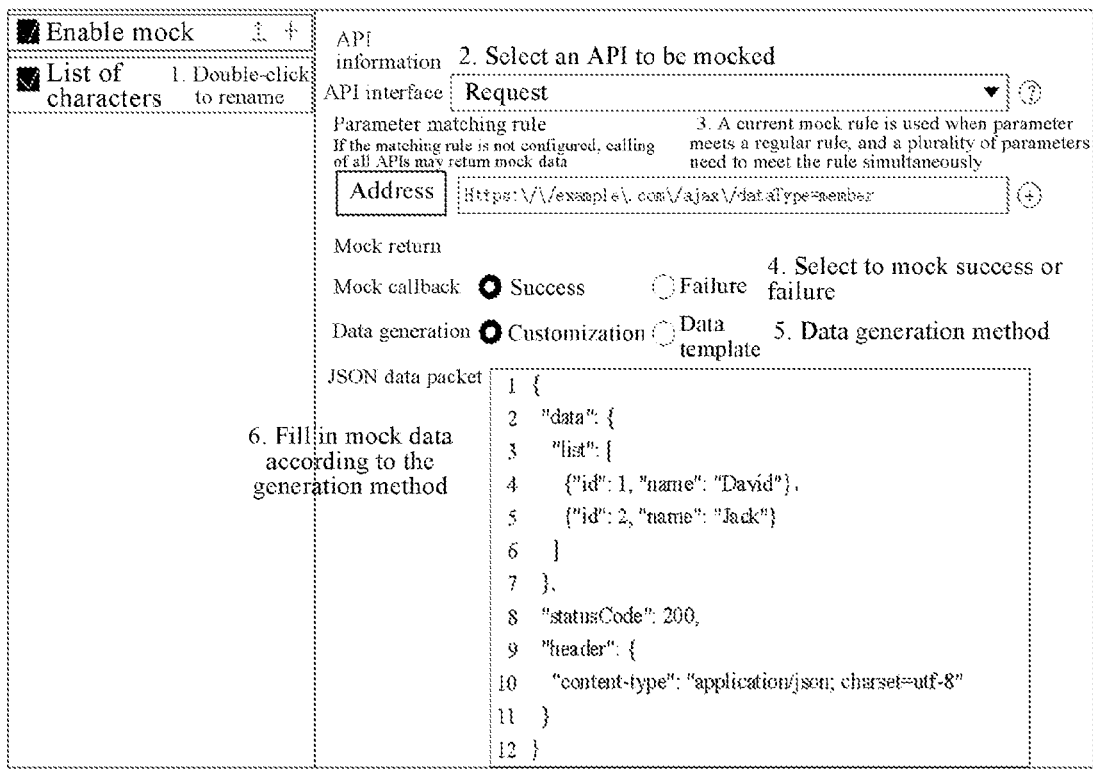
FIG. 2B is a schematic diagram of an interface mocking page (e.g., interface simulation page) according to an embodiment of this application.

To improve the development efficiency of a developer of an applet, an API Mock may be created in the developer tool to help the developer of the applet to develop the applet more smoothly. For example, as shown in FIG. 2A, in a Tab (tag) at the top of a tool testing panel of the developer tool, "Mock" is selected to enter a Mock entrance, and "+" is clicked to newly create rules to display an interface mocking page as shown in FIG. 2B.

(2) Add a to-be-simulated interface in the applet to the interface simulation page, to obtain a simulated interface of the applet.

For example, a Mock name (e.g., Simulated name) may be newly created in the interface simulation page, and a to-be-simulated API is selected to obtain a simulated interface of the applet.

(3) Perform parameter configuration and calling response setting on the simulated interface of the applet, to obtain interface configuration information of the simulated interface and simulated response data corresponding to the simulated interface.

For example, specifically, request identifier, request path, and request parameter configuration may be performed on the simulated interface of the applet, to obtain the interface configuration information of the mock interface; and a callback type, a data generation manner, and simulated data of the simulated interface may be set, to obtain the mock response data corresponding to the simulated interface.

For example, a parameter rule may be configured to use a current mock rule when parameters meet a regular rule, or a plurality of parameters may be configured to require the plurality of parameters to be met simultaneously. Then a callback type is selected, namely, mock callback success or failure needs to be selected. A data generation method such as customization or a data template is then selected, and simulated data is configured according to the generation method.

The parameters meeting a regular rule refers to, in a process of constructing a function, some special characters need to be escaped (adding "\" before the special characters). For example, in a regular expression, a special character is escaped by "\". That is, a character after "\" is generally not explained according to the original meaning, for example, /b/ matches a character "b", but after a backslash is added before b, /\b/ is escaped into matching a boundary of a word. Alternatively, a functional character in the regular expression is restored. For example, "*" matches a metacharacter before for 0 time or a plurality of times, /a*/ matches a, aa, or aaa, and after "\" is added, /a\*/ may only match "a*".

For example, when data that needs to be mocked is relatively complex, a data template may be used to quickly generate data meeting requirements. For example, if it is required that a returned list includes 10 different data, a "data template" may be selected in "data generation", and the following template is filled in:

```
{
    "data": }
        "list|10": [
            {"id|+1": 1, "name": "@FIRST"}
        ]
    },
    "statusCode": 200,
    "header": {
        "content-type": "application/json; charset=utf-8"
    }
}
```

For example, as shown in FIG. 2C, A data preview may be generated in real time below a template editor, which is convenient for confirming the correctness of the template.

Figure 2D:
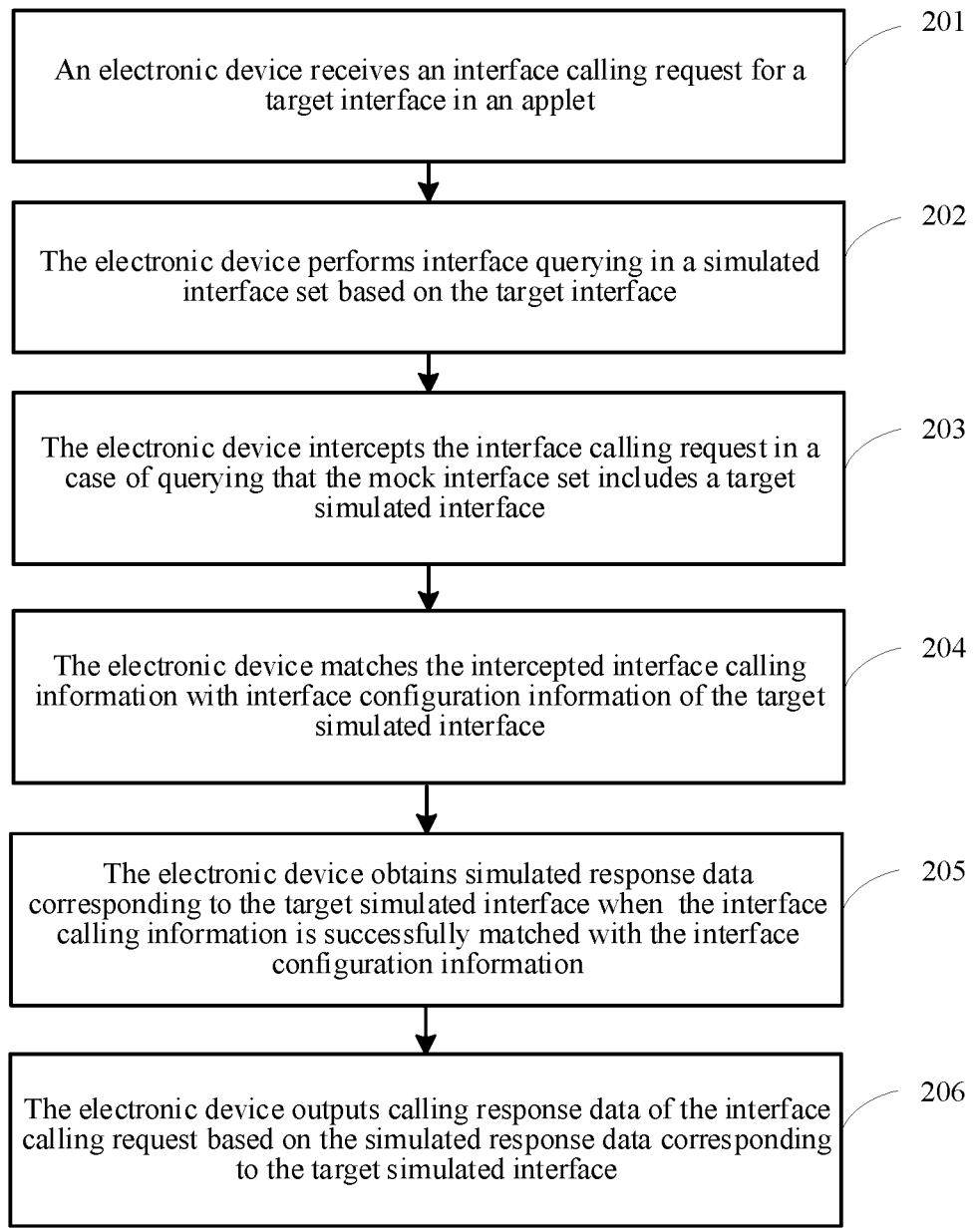
FIG. 2D is another flowchart of an interface calling method according to an embodiment of this application.

(II) Data returned by an interface may be simulated by using the created interface simulation module, and for details, reference may be made to FIG. 2D.

As shown in FIG. 2D, an interface calling method is provided, and a specific procedure may be as follows:

201. An electronic device receives an interface calling request for a target interface in an applet.

The interface calling request includes interface calling information of the target interface. For example, to improve the development efficiency, simulated data configuration may be performed on an interface that needs to be simulated, so that simulated response data returned by the interface may be simulated when interface calling is performed. For example, the electronic device can obtain a data packet of this request when a user transmits an interface calling request for a target interface in an applet, namely, obtain interface calling information of the target interface.

Figure 2E:
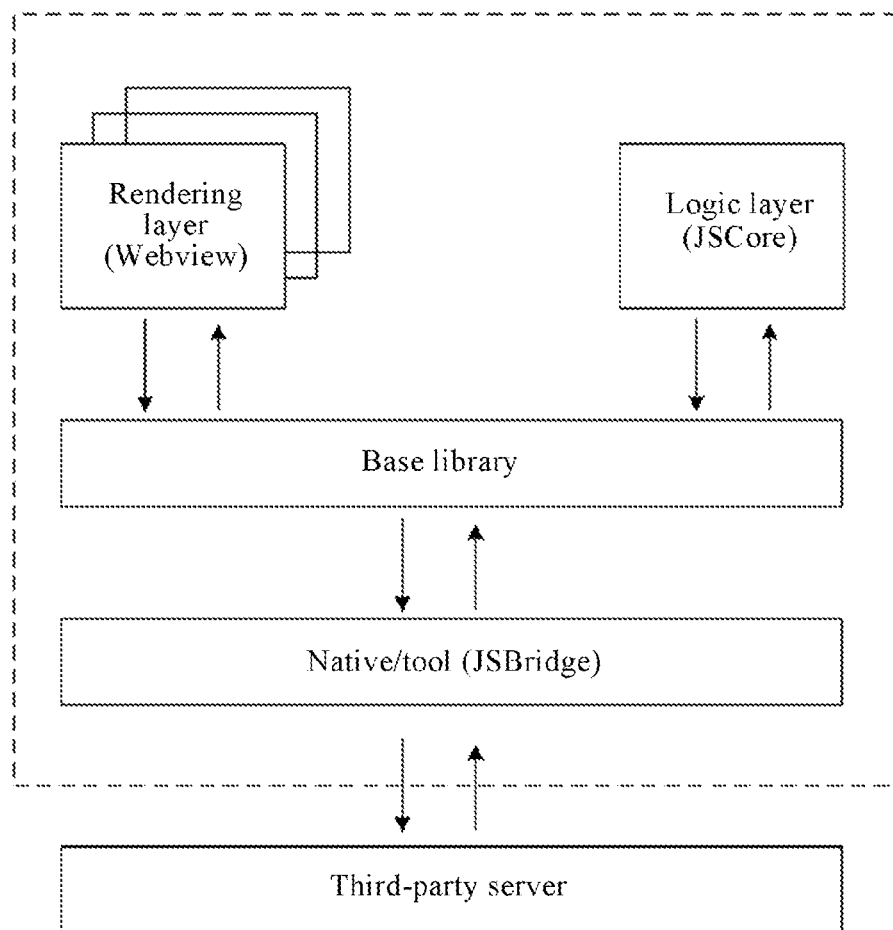
FIG. 2E is a flowchart of operation of an applet according to an embodiment of this application.
Figure 2F:
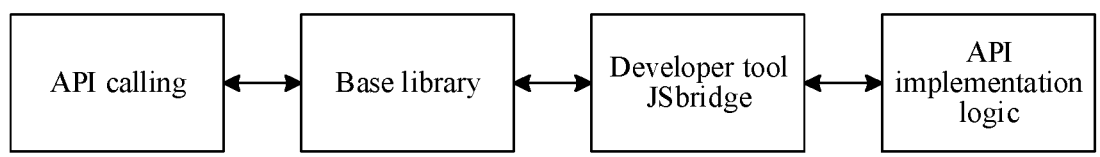
FIG. 2F is a flowchart of interface calling according to an embodiment of this application.

For example, as shown in FIG. 2E, the applet uses a mode that two threads are executed in parallel, which is referred to as a double-thread model. The two threads cooperate to complete rendering of the applet, where one thread is specially responsible for rendering work, which is generally referred to as a rendering layer (WebView); and the other thread executes logic code, which is generally referred to as a logic layer (JsCore). The two threads run simultaneously and exchange data through native/developer tools. A base library of the applet provides rich original APIs of instant messaging applications, so that capabilities provided by the instant messaging applications may be called conveniently, such as obtaining user information, local storage, and a payment function. The API Mock mainly simulates APIs called by the logic layer, and a calling procedure of a general API is shown in FIG. 2F. As can be known from FIG. 2F, the API calling in the figure corresponds to the logic layer (JsCore) in FIG. 2E and refers to APIs called by the logic layer. The developer tool (JSBridge) in the figure corresponds to the native/tool (JSBridge) in FIG. 2E, and API implementation logic in the figure corresponds to the third-party server in FIG. 2E.

For example, specifically, when it is detected that a logic layer in an applet calls a target interface, an interface calling request of the applet may be generated, and the interface calling request is received by a communication layer in the applet.

202. The electronic device performs interface querying in a simulated interface set based on the target interface.

The simulated interface set includes simulated interfaces mocking real interfaces in the applet. For example, specifically, the electronic device may obtain a mock interface set, the mock interface set includes simulated interfaces of at least one applet, and the simulated interfaces in the simulated interface set are traversed according to the target interface. When it is queried that the simulated interface set includes a simulated interface that is the same as the target interface, the simulated interface is determined as a target simulated interface.

For example, the electronic device may obtain a simulated interface list of the simulated interface set, and starts traversing from a start position of the mock interface list to match with the target interface sequentially. For example, the electronic device may traverse from the start position of the simulated interface list, and when a current simulated interface in the simulated interface list is traversed, match an interface name corresponding to the current simulated interface with an interface name of the target interface; when the matching succeeds, determine the current simulated interface as a target simulated interface corresponding to the target interface; and when the matching fails, update a next simulated interface of the current simulated interface as a current simulated interface, and perform the step when the current simulated interface in the mock interface list is traversed again until the simulated interface list is completely traversed.

If the simulated interface that is the same as the target interface is still not matched after all simulated interfaces in the simulated interface list are traversed, namely, if the simulated interface set does not include the simulated interface that is the same as the target interface, a real interface may be called. For example, the request is forwarded to a third-party server, and a normal calling procedure of an interface continues to be performed to obtain real calling response data, to ensure normal operation of tests, and the user may be further prompted, so that the user can add a mock interface corresponding to the target interface in the mock interface set according to an actual situation. For example, specifically, when the simulated interface set does not include the simulated interface that is the same as the target interface, the electronic device may call a real interface corresponding to the target interface in the application program to obtain calling response data, and output the calling response data corresponding to the interface calling request.

203. The electronic device intercepts the interface calling request when it is determined (e.g., via querying) that the simulated interface set includes a target simulated interface corresponding to the target interface.

For example, specifically, when it is queried that the simulated interface set includes a target simulated interface, the electronic device triggers a communication layer to perform an intercept operation, and intercepts the interface calling request in the communication layer based on the intercept operation.

Figure 2G:
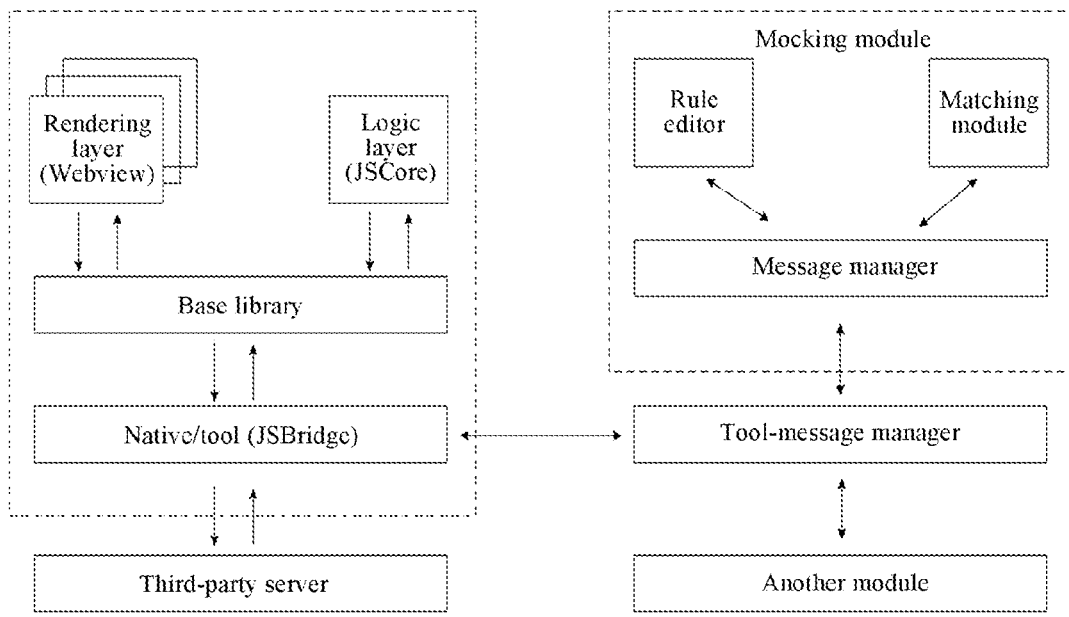
FIG. 2G is a flowchart of interface simulation according to an embodiment of this application.

Based on JSBridge, in the developer tool, a mock operation may be performed through a hook API. For example, as shown in FIG. 2G, to implement the mock function, the developer tool intercepts calling for related APIs on the JSBridge layer (that is, the communication layer), and forwards the request to the mocking module through Web-Socket.

The JSBridge is a communication manner before JS and Native. That is, the JSBridge defines communication between Native and JS, where Native calls JS only through a fixed bridge object, and JS also calls Native through a fixed bridge object.

A hook technology is also referred to as a hook function. Before the function is called by a system, a hook program first captures the message, and the hook function first obtains a right of control. In this case, the hook function can both process (change) execution behavior of the function or force to end transmission of the message.

The WebSocket is a protocol of performing full-duplex communication on a single TCP connection. The WebSocket enables data exchange between a communication client (for example, the applet in the electronic device) and the simulation module to be simpler, and allows the simulation module to actively push data to the communication client. Through a WebSocket API, the communication client and the mocking module can directly establish a persistent connection and perform bidirectional data transmission once one handshake is completed.

The simulation module may be mainly divided into three parts: a message processor, a rule editor, and an API calling matching module. The message processor is mainly implemented based on the WebSocket and is responsible for communication with a main procedure of the developer tool, and enabling/disabling mock, reading/writing rules, and receiving/returning API calling results may be implemented by using the message processor. The rule editor is mainly implemented based on Vue, and can configure an API name of a rule, a parameter matching rule, a mock result, and data of mock callback. The API calling matching module mainly searches, for an API calling message forwarded by the developer tool, for a suitable simulated rule from current existing rules, when a rule is hit, returns related simulated data through the message processor, or otherwise notifies the developer tool that the current rules are not hit, and continues to execute a normal procedure of API.

204: The electronic device matches the interface calling information in the intercepted interface calling request with interface configuration information of the target simulated interface.

For example, specifically, the electronic device may transmit the intercepted interface calling information to an interface simulation module in the applet; and trigger the interface simulation module to match the interface calling information with the interface configuration information of the target mock interface. For example, the developer tool may transmit the calling information to the mocking module, and the message processor in the simulation module transmits the calling information to the matching module after receiving the calling information.

205: The electronic device obtains simulated response data corresponding to the target simulated interface in a case that the interface calling information is successfully matched with the interface configuration information.

For example, when one simulated interface requests to be provided with a plurality of pieces of interface configuration information, and the interface calling information matches the plurality of pieces of interface configuration information simultaneously, the matching succeeds. For example, the interface calling information received by the electronic device may be as follows:

```
wx.request({
    url:'https://example.com/ajax?dataType=member',
    dataType:'json',
    success(res) {
        console.log(res)
    }
})
```

The url:'https://example.com/ajax?dataType=member' may be matched with a configured url request path and the dataType:'json' is matched with a configured data type, when the interface calling information is successfully matched with the plurality of pieces of interface configuration information simultaneously, the mock response data corresponding to the target mock interface may be determined according to the callback type, the data generation method, and the mock data that are set. For example, the mock response data is as shown by the JSON data packet in FIG. 2B.

206: The electronic device outputs calling response data of the interface calling request based on the mock response data corresponding to the target simulated interface.

For example, specifically, after the mock response data corresponding to the target mock interface is determined, the calling response data of the interface calling request may be generated and returned to the client. That is, the calling response data of the interface calling request is returned. For example, the calling response data may be as follows:

```
{data :{... }, header:{... }, statusCode:200, errMsg:"request:ok"}
    data
        list:Array(2)
            0: {id:1, name:"David"}
            1: {id:2, name:"Jack"}
            length:2
            nv_length:(... )
            _proto_:Array(0)
        _proto_:Object
    errMsg:"request:ok"
    header:
    content-type:"application/json; charset=utf-8"
        _proto_:Object
    statusCode:200
    _proto_:Object
```

When a list returned by using a data template (the simulated template shown in FIG. 2C) includes 10 different data, the calling response data returned by the calling interface may be as follows:

```
{{data:{... }, header:{... }, statusCode:200, errMsg:"request:ok"}
    data
        list:Array(10)
            0: {id:1, name:"Nancy"}
            1: {id:2, name:"Kimberly"}
```

-continued

```
        2: {id:3, name:"Sandra"}
        3: {id:4, name:"Linda"}
        4: {id:5, name:"George"}
        5: {id:6, name:"Ronald"}
        6: {id:7, name:"Ruth"}
        7: {id:8, name:"Dorothy"}
        8: {id:9, name:"Kevin"}
        9: {id:10, name:"Robert"}
        length:10
        nv_length:(... )
    _proto_:Array(0)
  _proto_:Object
  errMsg:"request:ok"
  header:{content-type:"application/json; charset=utf-8"}
    statusCode:200
    _proto_:Object
```

Figure 2H:
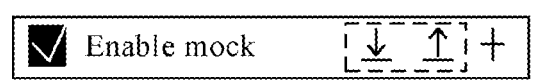
FIG. 2H is a schematic diagrams of simulating data import and export according to an embodiment of this application.

To facilitate multi-person cooperation, when it is required to share the interface configuration information of the simulated interface with other members in a development project, the interface configuration information may be exported in the interface simulation module, and a configuration file is then transmitted to other members for importing. For example, as shown in FIG. 2H, an import or export operation may be performed by using a control in a dashed line box in the figure on the configured interface configuration information and mock response data.

In addition to common request APIs, the applet further includes other APIs to support the mock capability. For example, specific development scenarios include: 1. Mocking (e.g., simulating) a specific user scenario, such as wx.getLocation, namely, an obtaining position; 2. Mocking abnormal situations, for example, wx.request is configured as fail callback, to mock network anomaly; and 3. Some APIs that not support testing in tools, such as wx.chooseInvoice related to invoices, which does not need to be tested in a real machine, thereby further improving the comprehensiveness and integrity of the API Mock.

As can be known from the above, this embodiment may include: receiving an interface calling request for a target interface in an applet, the interface calling request including interface calling information of the target interface; performing interface querying in a simulated interface set based on the target interface, the simulated interface set including simulated interfaces simulating real interfaces in the applet; intercepting the interface calling request in a case of querying that the simulated interface set includes a target mock interface, and matching the intercepted interface calling information with interface configuration information of the target mock interface; obtaining simulated response data corresponding to the target simulated interface in a case that the interface calling information is successfully matched with the interface configuration information; and outputting calling response data of the interface calling request based on the simulated response data corresponding to the target mock interface. The frontend and the backend develop at the same time, when the frontend does not have support of interface data of the backend, a frontend developer can create an interface simulating module in the developer tool, search the target simulated interface corresponding to the target interface in the mock interface set according to the interface calling request for the target interface, and generate the calling response data according to the mock response data set by the target mock interface, so that the frontend can simulate data to complete interface testing, thereby improving the interface testing efficiency, simulating development, and improving the development efficiency. In this solution, the interface simulating module is created, code does not need to be embedded into code, no extra packet or framework is introduced, which is totally independent development, so that code can be reused, has few dependence, which is convenient for porting. This solution is an API Mock solution performing hooking based on JSBridge and implemented according to an applet model. Therefore, testing may be directly performed in configuration of a developer tool, and most applet APIs are supported, including wx.request, wx.downloadFile, ws.getLocation, and wx.checkSession. In addition, importing and exporting are supported, which facilitates multi-person cooperation. According to the API Mock capability of the developer tool, a developer of the applet can have better development experience, such as fleeting development experience independent of backend, non-invasive mock data, better mock sharing, more comprehensive unit testing, and combination with automatic testing.

To better implement the foregoing method, correspondingly, the embodiments of this application further provide an interface calling apparatus. The interface calling apparatus may be specifically integrated in a terminal, and the terminal may include devices that can implement interface calling such as a mobile phone, a tablet computer, a notebook computer and/or a PC.

Figure 3:
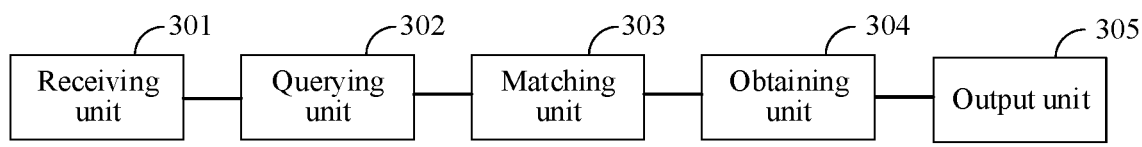
FIG. 3 is a schematic structural diagram of an interface calling apparatus according to an embodiment of this application.

For example, as shown in FIG. 3, the interface calling apparatus may include a receiving unit 301, a querying unit 302, a matching unit 303, an obtaining unit 304, and an output unit 305.

(1) Receiving Unit 301

The receiving unit 301 is configured to receive an interface calling request for a target interface in an application program, the interface calling request including interface calling information of the target interface.

In some embodiments, the receiving unit 301 may be specifically configured to: in a case of detecting that a logic layer in the application program calls the target interface, generate the interface calling request of the application program; and receive the interface calling request by using a communication layer in the application program.

(2) Querying Unit 302

The querying unit 302 is configured to perform interface querying in a simulated interface set based on the target interface, the simulated interface set including simulated interfaces simulating real interfaces in the application program.

In some embodiments, the querying unit 302 may include an obtaining subunit, a traversing subunit, and a determining subunit;

the obtaining subunit may be specifically configured to obtain a mock interface set, the mock interface set including mock interfaces of at least one application program;

the traversing subunit may be specifically configured to traverse the simulated interfaces in the mock interface set according to the target interface; and the determining subunit may be specifically configured to: when it is queried that the mock interface set includes a simulated interface that is the same as the target interface, determine the simulated interface as a target mock interface.

In some embodiments, the determining subunit may be specifically configured to: in accordance with a determination that the simulated interface set does not include the simulated interface that is the same as the target interface, call a real interface corresponding to the target interface in the application program to obtain calling response data; and output the calling response data of the interface calling request.

(3) Matching Unit 303

The matching unit 303 is configured to intercept the interface calling request in a case of querying that the simulated interface set includes a target simulated interface, and match the intercepted interface calling information with interface configuration information of the target simulated interface.

In some embodiments, the matching unit 303 may include an interception subunit and a matching subunit; the interception subunit may be specifically configured to: trigger the communication layer to perform an intercept operation in a case of querying that the simulated interface set includes the target simulated interface; and intercept the interface calling request in the communication layer based on the intercept operation.

In some embodiments, the matching subunit may be specifically configured to: transmit the intercepted interface calling information to an interface simulation module in the application program; and trigger the interface simulation module to match the interface calling information with the interface configuration information of the target simulated interface.

In some embodiments, the interface calling apparatus may further include a configuration unit 306, and the configuration unit may include a display subunit, an adding subunit, and a configuration subunit;

the display subunit may be specifically configured to display an interface simulation page of the interface simulation module;

the adding subunit may be specifically configured to add a to-be-mocked interface in the application program to the interface mocking page, to obtain a mock interface (e.g., simulated interface) of the application program; and the configuration subunit may be specifically configured to perform parameter configuration and calling response setting on the simulated interface of the application program, to obtain interface configuration information of the simulated interface and simulated response data corresponding to the simulated interface.

In some embodiments, the configuration subunit may be specifically configured to perform request identifier, request path, and request parameter configuration on the simulated interface of the application program, to obtain the interface configuration information of the simulated interface; and set a callback type, a data generation manner, and simulated data of the simulated interface, to obtain the simulated response data corresponding to the simulated interface.

(4) Obtaining Unit 304

The obtaining unit 304 is configured to obtain simulated response data corresponding to the target simulated interface when the interface calling information is successfully matched with the interface configuration information.

(5) Output Unit 305

The output unit 305 is configured to output calling response data of the interface calling request based on the simulated response data corresponding to the target simulated interface.

During specific implementations, the foregoing units may be implemented as independent entities, or may be randomly combined, or may be implemented as the same entity or several entities. For specific implementations of the foregoing units, refer to the foregoing method embodiments. Details are not described herein again.

As can be known from the above, this embodiment may include: receiving, by the receiving unit 301, an interface calling request for a target interface in an application program, the interface calling request including interface calling information of the target interface; performing, by the querying unit 302, interface querying in a simulated interface set based on the target interface, the simulated interface set including mock interfaces mocking real interfaces in the application program; intercepting, by the matching unit 303, the interface calling request in a case of querying that the simulated interface set includes a target simulated interface, and matching the intercepted interface calling information with interface configuration information of the target simulated interface; obtaining, by the obtaining unit 304, simulated response data corresponding to the target simulated interface in a case that the interface calling information is successfully matched with the interface configuration information; and outputting, by the output unit 305, calling response data of the interface calling request based on the simulated response data corresponding to the target simulated interface. In this solution, the frontend and the backend develop at the same time, when the frontend does not have support of interface data of the backend, according to this solution, the target simulated interface corresponding to the target interface may be searched in the simulated interface set according to the interface calling request for the target interface, and the calling response data may be generated according to the simulated response data set by the target simulated interface, so that the frontend can simulated fake data to complete interface testing, thereby improving the interface testing efficiency, mocking development, and improving the development efficiency. In this solution, the interface simulation module is created, code does not need to be embedded into code, no extra packet or framework is introduced, which is totally independent development, so that code can be reused, has few dependence, which is convenient for porting, supports importing and exporting, and is convenient for multi-person cooperation.

Figure 4:
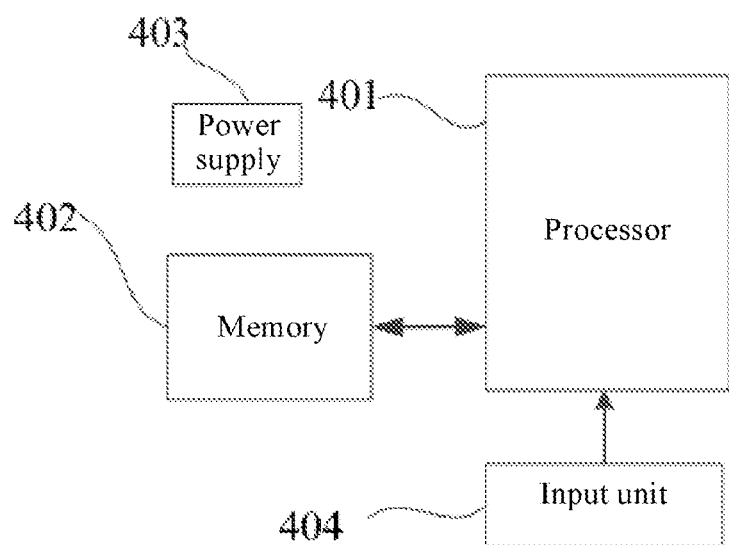
FIG. 4 is a schematic structural diagram of an electronic device according to an embodiment of this application.

In addition, the embodiments of this application further provide an electronic device. FIG. 4 is a schematic structural diagram of an electronic device according to an embodiment of this application. Specifically, the electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and calling data stored in the memory 402, the processor performs various functions of the electronic device and processes data, thereby performing overall monitoring on the electronic device. The processor 401 may include one or more processing cores. The processor 401 may integrate an application processor and a modem. The application processor mainly processes an operating system, a user interface, an application program, and the like. The modem mainly processes wireless communication. It may be understood that the foregoing modem may either not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (for example, a sound playback function and an image playback function), or the like. The data storage area may store data created according to use of the electronic device. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. The power supply 403 may be logically connected to the processor 401 by using a power supply management system, thereby implementing functions, such as charging, discharging, and power consumption management, by using the power supply management system. The power supply 403 may further include one or more of a direct current or alternating current power supply, a re-charging system, a power failure detection circuit, a power supply converter or inverter, a power supply state indicator, and any other components.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 in the electronic device may load executable files corresponding to processes of one or more application programs to the memory 402 according to the following instructions, and the processor 401 runs the application program stored in the memory 402, to implement various functions as follows:

receiving an interface calling request for a target interface in an application program, the interface calling request including interface calling information of the target interface; performing interface querying in a simulated interface set based on the target interface, the mock interface set including simulated interfaces simulating real interfaces in the application program; intercepting the interface calling request when it is queried that the simulated interface set includes a target simulated interface, and matching the intercepted interface calling information with interface configuration information of the target simulated interface; obtaining mock response data corresponding to the target simulated interface in a case that the interface calling information is successfully matched with the interface configuration information; and outputting calling response data of the interface calling request based on the simulated response data corresponding to the target simulated interface.

For specific implementations of the above operations, refer to the foregoing embodiments. Details are not described herein again.

As can be known from the above, this embodiment may include: receiving an interface calling request for a target interface in an application program, the interface calling request including interface calling information of the target interface; performing interface querying in a simulated interface set based on the target interface, the simulated interface set including simulated interfaces mocking real interfaces in the application program; intercepting the interface calling request in a case of querying that the mock interface set includes a target simulated interface, and matching the intercepted interface calling information with interface configuration information of the target simulated interface; obtaining simulated response data corresponding to the target simulated interface in a case that the interface calling information is successfully matched with the interface configuration information; and outputting calling response data of the interface calling request based on the simulated response data corresponding to the target simulated interface. The frontend and the backend develop at the same time, when the frontend does not have support of interface data of the backend, according to this solution, the target simulated interface corresponding to the target interface may be searched in the simulated interface set according to the interface calling request for the target interface, and the calling response data may be generated according to the simulated response data set by the target simulated interface, thereby mocking development and improving the development efficiency. In this solution, the interface simulation module is created, code does not need to be embedded into code, no extra packet or framework is introduced, which is totally independent development, so that code can be reused, has few dependence, which is convenient for porting, supports importing and exporting, and is convenient for multi-person cooperation.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Therefore, the embodiments of this application further provide a computer-readable storage medium, storing a plurality of instructions, the instructions being capable of being loaded by a processor, to perform the steps in interface calling method according to the embodiments of this application. For example, the instructions may perform the following steps:

receiving an interface calling request for a target interface in an application program, the interface calling request including interface calling information of the target interface; performing interface querying in a simulated interface set based on the target interface, the simulated interface set including simulated interfaces simulating real interfaces in the application program; intercepting the interface calling request when it is queried that the simulated interface set includes a target simulated interface, and matching the intercepted interface calling information with interface configuration information of the target simulated interface; obtaining simulated response data corresponding to the target simulated interface when the interface calling information is successfully matched with the interface configuration information; and outputting calling response data of the interface calling request based on the simulated response data corresponding to the target simulated interface.

For specific implementations of the above operations, refer to the foregoing embodiments. Details are not described herein again.

The computer-readable storage medium may include: a read-only memory (ROM), a random access memory (RAM), a magnetic disk, an optical disc or the like.

Because the instructions stored in the computer-readable storage medium may perform the steps of any interface calling method provided in the embodiments of this application, the instructions can implement beneficial effects that may be implemented by any interface calling method provided in the embodiments of this application. For details, reference may be made to the foregoing embodiments. Details are not described herein again.

The interface calling method and apparatus, and the computer-readable storage medium provided in the embodiments of this application are described in detail above. The principles and implementations of this application are described through specific examples in this specification, and the descriptions of the embodiments are only intended to help understand the methods and core ideas of this application. Meanwhile, a person skilled in the art may make modifications to the specific implementations and application scopes according to the ideas of this application. In conclusion, the content of this specification is not to be construed as a limitation to this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs interface invocation requests and obtaining simulated response data. In practical application, the foregoing functions may be allocated to and completed by different functional modules according to requirements, that is, an inner structure of a device is divided into different functional modules to implement all or a part of the functions described above.

What is claimed is:

1. An interface calling method for a development phase of an applet of an application program, performed by an electronic device, the method comprising:
providing a simulated interface set of the application program, the simulated interface set including a set of simulated interfaces that simulate actual interfaces of the application program for interacting with a remote server via the application program;
performing parameter configuration and calling response setting on a first simulated interface of the application program, to obtain interface configuration information of the first simulated interface and simulated response data corresponding to the first simulated interface;
receiving an interface calling request by the applet for a target interface in the application program, the interface calling request including interface calling information of the target interface, the applet performing a specific task of the application program;
based on the target interface, performing an interface query in the simulated interface set;
in accordance with a determination, based on the interface query, that the first simulated interface corresponding to the target interface exists in the simulated interface set, intercepting the interface calling request;
comparing the interface calling information in the intercepted interface calling request with the interface configuration information of the first simulated interface;
in accordance with a determination that the interface calling information matches the interface configuration information of the first simulated interface, obtaining the simulated response data corresponding to the first simulated interface; and
based on the simulated response data, outputting calling response data of the interface calling request.

2. The method according to claim 1, wherein performing the interface query comprises:
obtaining the simulated interface set, the simulated interface set including simulated interfaces of at least one application program;
traversing the simulated interfaces in the simulated interface set according to the target interface; and
when it is queried that the simulated interface set includes a simulated interface that is the same as the target interface, determining the simulated interface as a target simulated interface corresponding to the target interface.

3. The method according to claim 2, further comprising after traversing the simulated interfaces in the simulated interface set:
in accordance with a determination that the simulated interface set does not contain a simulated interface that is identical to the target interface, invoking a real interface corresponding to the target interface in the application program to obtain calling response data; and
outputting the calling response data of the interface calling request.

4. The method according to claim 1, wherein receiving the interface calling request comprises:
detecting that the interface calling request is from a logic layer in the application program;
generating the interface calling request of the application program in accordance with the detecting; and
receiving the interface calling request by using a communication layer in the application program.

5. The method according to claim 4, wherein intercepting the interface calling request comprises:
triggering the communication layer to perform an intercept operation in accordance with a determination that the simulated interface set includes the first simulated interface corresponding to the target interface; and
intercepting the interface calling request in the communication layer based on the intercept operation.

6. The method according to claim 1, wherein comparing the interface calling information in the intercepted interface calling request with the interface configuration information of the first simulated interface comprises:
transmitting the intercepted interface calling information to an interface simulation module in the application program; and
triggering the interface simulation module to compare the interface calling information with the interface configuration information of the first simulated interface.

7. The method according to claim 1, wherein performing the parameter configuration and calling response setting comprises:
   performing request identifier, request path, and request parameter configuration on the first simulated interface of the application program, to obtain the interface configuration information of the first simulated interface; and
   setting a callback type, a data generation manner, and simulated data of the first simulated interface, to obtain the simulated response data corresponding to the first simulated interface.

8. An electronic device for performing interface calling for a development phase of an applet of an application program, the electronic device comprising:
   one or more processors; and
   memory storing one or more programs, the one or more programs comprising instructions that, when executed by the one or more processors, cause the one or more processors to perform operations comprising:
      providing a simulated interface set of the application program, the simulated interface set including a set of simulated interfaces that simulate actual interfaces of the application program for interacting with a remote server via the application program;
      performing parameter configuration and calling response setting on a first simulated interface of the application program, to obtain interface configuration information of the first simulated interface and simulated response data corresponding to the first simulated interface;
      receiving an interface calling request by the applet for a target interface in the application program, the interface calling request including interface calling information of the target interface, the applet performing a specific task of the application program;
      based on the target interface, performing an interface query in the simulated interface set;
      in accordance with a determination, based on the interface query, that the first simulated interface corresponding to the target interface exists in the simulated interface set, intercepting the interface calling request;
      comparing the interface calling information in the intercepted interface calling request with the interface configuration information of the first simulated interface;
      in accordance with a determination that the interface calling information matches the interface configuration information of the first simulated interface, obtaining simulated response data corresponding to the first simulated interface; and
      based on the simulated response data, outputting calling response data of the interface calling request.

9. The electronic device according to claim 8, wherein performing the interface query comprises:
   obtaining the simulated interface set, the simulated interface set including simulated interfaces of at least one application program;
   traversing the simulated interfaces in the simulated interface set according to the target interface; and
   when it is queried that the simulated interface set includes a simulated interface that is the same as the target interface, determining the simulated interface as a target simulated interface corresponding to the target interface.

10. The electronic device according to claim 8, the operations further comprising:
    after traversing the simulated interfaces in the simulated interface set:
       in accordance with a determination that the simulated interface set does not contain a simulated interface that is identical to the target interface, invoking a real interface corresponding to the target interface in the application program to obtain calling response data; and
       outputting the calling response data of the interface calling request.

11. The electronic device according to claim 8, wherein receiving the interface calling request comprises:
    detecting that the interface calling request is from a logic layer in the application program;
    generating the interface calling request of the application program in accordance with the detecting; and
    receiving the interface calling request by using a communication layer in the application program.

12. The electronic device according to claim 11, wherein intercepting the interface calling request comprises:
    triggering the communication layer to perform an intercept operation in accordance with a determination that the simulated interface set includes the first simulated interface corresponding to the target interface; and
    intercepting the interface calling request in the communication layer based on the intercept operation.

13. The electronic device according to claim 8, wherein comparing the interface calling information in the intercepted interface calling request with the interface configuration information of the first simulated interface comprises:
    transmitting the intercepted interface calling information to an interface simulation module in the application program; and
    triggering the interface simulation module to compare the interface calling information with the interface configuration information of the first simulated interface.

14. The electronic device according to claim 8, wherein performing the parameter configuration and calling response setting comprises:
    performing request identifier, request path, and request parameter configuration on the first simulated interface of the application program, to obtain the interface configuration information of the first simulated interface; and
    setting a callback type, a data generation manner, and simulated data of the first simulated interface, to obtain the simulated response data corresponding to the first simulated interface.

15. A non-transitory computer-readable storage medium, storing a computer program, the computer program, when executed by one or more processors of an electronic device for performing interface calling for a development phase of an applet of an application program, cause the one or more processors to perform operations comprising:
    providing a simulated interface set of the application program, the simulated interface set including a set of simulated interfaces that simulate actual interfaces of the application program for interacting with a remote server via the application program;
    performing parameter configuration and calling response setting on a first simulated interface of the application program, to obtain interface configuration information of the first simulated interface and simulated response data corresponding to the first simulated interface;

receiving an interface calling request by the applet for a target interface in the application program, the interface calling request including interface calling information of the target interface, the applet performing a specific task of the application program;

based on the target interface, performing an interface query in the simulated interface set;

in accordance with a determination, based on the interface query, that the first simulated interface corresponding to the target interface exists in the simulated interface set, intercepting the interface calling request;

comparing the interface calling information in the intercepted interface calling request with the interface configuration information of the first simulated interface;

in accordance with a determination that the interface calling information matches the interface configuration information of the first simulated interface, obtaining simulated response data corresponding to the first simulated interface; and based on the simulated response data, outputting calling response data of the interface calling request.

16. The non-transitory computer readable storage medium according to claim 15, wherein performing the interface query comprises:

obtaining the simulated interface set, the simulated interface set including simulated interfaces of at least one application program;

traversing the simulated interfaces in the simulated interface set according to the target interface; and when it is queried that the simulated interface set includes a simulated interface that is the same as the target interface, determining the simulated interface as a target simulated interface corresponding to the target interface.

17. The non-transitory computer readable storage medium according to claim 16, the operations further comprising:

after traversing the simulated interfaces in the simulated interface set:

in accordance with a determination that the simulated interface set does not contain a simulated interface that is identical to the target interface, invoking a real interface corresponding to the target interface in the application program to obtain calling response data; and outputting the calling response data of the interface calling request.

18. The non-transitory computer readable storage medium according to claim 15, wherein receiving the interface calling request comprises:

detecting that the interface calling request is from a logic layer in the application program;

generating the interface calling request of the application program in accordance with the detecting; and receiving the interface calling request by using a communication layer in the application program.

* * * * *